US012025228B2

(12) United States Patent
Miyazoe et al.

(10) Patent No.: US 12,025,228 B2
(45) Date of Patent: Jul. 2, 2024

(54) SEAL STRUCTURE FOR SPOOL-TYPE SWITCHING VALVE, AND SAID SPOOL-TYPE SWITCHING VALVE

(71) Applicant: SMC CORPORATION, Chiyoda-ku (JP)

(72) Inventors: Shinji Miyazoe, Moriya (JP); Kazuhiro Noguchi, Tsukubamirai (JP); Kazuhiro Umeda, Noda (JP); Masayuki Kudo, Joso (JP); Masahiko Kawakami, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 490 days.

(21) Appl. No.: 17/262,473

(22) PCT Filed: Jul. 11, 2019

(86) PCT No.: PCT/JP2019/027454
§ 371 (c)(1),
(2) Date: Jan. 22, 2021

(87) PCT Pub. No.: WO2020/026744
PCT Pub. Date: Feb. 6, 2020

(65) Prior Publication Data
US 2021/0215252 A1     Jul. 15, 2021

(30) Foreign Application Priority Data

Aug. 2, 2018  (JP) ................................ 2018-146327

(51) Int. Cl.
*F16K 11/07* (2006.01)
*F16J 15/3228* (2016.01)
*F16J 15/44* (2006.01)

(52) U.S. Cl.
CPC ......... *F16J 15/3228* (2013.01); *F16J 15/441* (2013.01); *F16K 11/07* (2013.01)

(58) Field of Classification Search
CPC ...................................................... F16K 11/07
(Continued)

(56) References Cited

U.S. PATENT DOCUMENTS

| 3,895,815 | A |   | 7/1975  | Panigati      |            |
|-----------|---|---|---------|---------------|------------|
| 5,934,323 | A |   | 8/1999  | Akimoto et al.|            |
| 5,971,022 | A | * | 10/1999 | Hayashi       | F16K 11/0712 |
|           |   |   |         |               | 137/625.69 |

(Continued)

FOREIGN PATENT DOCUMENTS

| CN | 1196456 A   | 10/1998 |
|----|-------------|---------|
| CN | 101725738 A | 6/2010  |

(Continued)

OTHER PUBLICATIONS

Extended European Search Report dated Feb. 7, 2022 in European Patent Application No. 19844607.2, 8 pages.

(Continued)

*Primary Examiner* — Paul J Gray
(74) *Attorney, Agent, or Firm* — Oblon, McClelland, Maier & Neustadt, L.L.P.

(57) ABSTRACT

A sealing structure is configured in the following manner. When a packing having a pair of sealing portions formed at opposite edge portions of the outer peripheral surface thereof is installed in a land portion of a spool, the outside diameter of the packing is made smaller than the diameter of a slide surface of a spool hole. In a state in which the outer periphery of the land portion opposes the slide surface and a pressurized fluid is supplied from a gas supply channel to the first space of first and second spaces that are partitioned by the land portion, the edge portion of the packing positioned near the first space is elastically elongated in a radial direction due to pressure of the pressurized fluid and thereby (Continued)

narrows a gap formed between the first sealing portion and the slide surface of the spool hole or abuts the slide surface.

14 Claims, 6 Drawing Sheets

(58) Field of Classification Search
USPC .................................................. 137/625.69
See application file for complete search history.

(56) References Cited

U.S. PATENT DOCUMENTS

| 8,844,937 | B2 | 9/2014 | Watanabe | |
|---|---|---|---|---|
| 2010/0096033 | A1* | 4/2010 | Yoshimura | F16K 11/0712 |
| | | | | 137/625.69 |
| 2010/0258210 | A1 | 10/2010 | Miyazoe et al. | |
| 2011/0193000 | A1 | 8/2011 | Miyazoe et al. | |
| 2014/0097130 | A1* | 4/2014 | Wilfong | F16K 11/0712 |
| | | | | 210/85 |
| 2015/0226344 | A1 | 8/2015 | Miyazoe et al. | |
| 2018/0080564 | A1 | 3/2018 | Tanner et al. | |

FOREIGN PATENT DOCUMENTS

| CN | 101858444 | A | 10/2010 |
|---|---|---|---|
| CN | 102147025 | A | 8/2011 |
| CN | 104832700 | A | 8/2015 |
| CN | 106979362 | A | 7/2017 |
| DE | 71 05 705 | U | 8/1971 |
| JP | 49-112059 | A | 10/1974 |
| JP | 2007-271030 | A | 10/2007 |
| JP | 2010-14202 | A | 1/2010 |
| JP | 2010-101341 | A | 5/2010 |
| JP | WO2012/124534 | A1 | 9/2012 |

OTHER PUBLICATIONS

Combined Chinese Office Action and Search Report dated Jan. 19, 2023 in Chinese Application 201980051083.8, (with English Translation), 14 pages.
International Search Report dated Oct. 1, 2019 in PCT/JP2019/027454 filed on Jul. 11, 2019, 2 pages.

* cited by examiner (a)

(b)

(a)

(b)

(a)

(b)

SEAL STRUCTURE FOR SPOOL-TYPE SWITCHING VALVE, AND SAID SPOOL-TYPE SWITCHING VALVE

TECHNICAL FIELD

The present invention relates to a seal structure formed of a land portion of a spool and a slide surface of a spool hole in a spool-type switching valve in which the spool is slidably inserted in the spool hole and also relates to the spool-type switching valve that includes the seal structure.

BACKGROUND ART

Spool-type switching valves are widely known. As disclosed in PTL 1, for example, a spool-type switching valve has a gas supply port to be connected to a pressurized fluid source, an output port to output a pressurized fluid from the pressurized fluid source to an external device, such as an actuator, and a gas discharge port that discharges exhaust gas from the actuator. The spool, which serves as a valve body, is moved in the spool hole formed inside the spool-type switching valve. The connection state among these ports is switched by moving the spool in the spool hole.

More specifically, the gas supply port, the output port, and the gas discharge port are in communication with the spool hole. The spool has land portions (large-diameter portions) that serve as valve portions and also has annular recesses (small-diameter portions) that serve as flow channels, and the land portions and the annular recesses are formed alternately in the axis direction. In addition, the spool-type switching valve is configured such that the spool is slidably moved in the spool hole in the axis direction by a drive unit formed, for example, of an electromagnetic pilot valve unit. Annular channel recesses recessed at positions corresponding to respective ports and annular slide surfaces on which the land portions of the spool slide are formed at the inner peripheral surface of the spool hole alternately in the axis direction. The bottoms of the channel recesses are in communication with corresponding ports. The outer peripheral surface of each land portion serves as a sliding surface at which an annular packing is installed. The packing is made of an elastic rubber member to seal the gap between the sliding surface of the land portion and the corresponding slide surface of the spool hole so as to prevent leakage of the pressurized fluid through the gap.

In the known switching valve disclosed in PTL 1, the outside diameter of the packing when it is fitted in the sliding surface of the land portion is made larger than the inside diameter of the corresponding slide surface of the spool hole in order to ensure sealing between the sliding surface of the land portion of the spool and the slide surface of the spool hole. In other words, when the sliding surface of the packing opposes the slide surface of the spool hole, the packing is continuously pressed against the slide surface of the spool hole, while the packing is deformed elastically. When the spool is moved to switch the connection state among the ports, the packing hits the opening edge of the corresponding channel recess of the spool hole, and subsequently the compressed packing runs up onto the slide surface of the spool hole.

In the seal structure of the known spool-type switching valve, however, if the packing is pressed against the slide surface of the spool hole for a long period of time, the packing may be deformed permanently or stuck to the slide surface of the spool hole. Depending on the shape and conditions of the inner peripheral surface of the spool hole, which directly affects the packing, repeated operation of the spool may cause wear or twisting of the packing due to frictional resistance in sliding between the packing and the slide surface of the spool hole. Repeated hitting of the packing against the opening edge of the channel recess causes repeated loading on the packing, which leads not only to deterioration in spool performance but also to physical deterioration or damage of the packing.

CITATION LIST

Patent Literature

PTL 1: Japanese Unexamined Patent Application Publication No. 2010-101341

SUMMARY OF INVENTION

Technical Problem

A technical problem of the present invention is to provide a seal structure formed between a spool and a spool hole in a spool-type switching valve that enables smooth operation of the spool and can extend the service life of a packing and also to provide the spool-type switching valve that includes the seal structure.

Solution to Problem

To solve the above problem, the present invention provides a seal structure for a spool-type switching valve. The switching valve has a spool hole that is formed so as to extend in an axis direction and is in communication with a gas supply channel, an output channel, and a gas discharge channel. The switching valve also has a spool inserted in the spool hole and slidable in the axis direction and a valve actuation unit that moves the spool so as to switch a connection state of the channels. The spool has land portions and annular recesses that are disposed alternately in the axis direction. The land portions have respective sliding portions formed on outer peripheries thereof, and the annular recesses have outside diameters smaller than outside diameters of the land portions. The spool hole is defined by an inner peripheral surface formed annularly around the axis, and annular channel recesses and annular slide surfaces are formed at the inner peripheral surface alternately in the axis direction. The channel recesses are recessed respectively at positions of the gas supply channel, the output channel, and the gas discharge channel and are connected to these channels. The land portions of the spool are slidable with the sliding portions opposing respective slide surfaces of the spool hole. An annular groove is formed in the sliding portion of each land portion so as to annularly surround the axis and so as to open in a radial direction. An inner end portion of a packing that includes an inner periphery of the packing is accommodated in the groove, and an outer end portion of the packing that includes an outer periphery of the packing protrudes from an opening edge of the groove. The packing is made of an elastic rubber member. A first sealing portion is formed at one edge portion of the outer end portion of the packing so as to annularly surround the axis, and a second sealing portion is formed at the other edge portion of the outer end portion of the packing so as to annularly surround the axis. The one edge portion is positioned opposite to the other edge portion in the axis direction. When the packing is accommodated in the groove, outside diameters of the first sealing portion and the second sealing portion of the packing are made smaller than an inside diameter of a corresponding one of the slide surfaces of the spool hole. In a state in which the sliding portion of each land portion opposes the corresponding slide surface of the spool hole and a pressurized fluid is supplied from the gas supply channel to one of a pair of spaces in the spool hole partitioned by each land portion, the edge portion of the packing positioned near the space to which the pressurized fluid is supplied is elastically elongated in the radial direction due to pressure of the pressurized fluid, and one of the first sealing portion and the second sealing portion, which is positioned near the space to which the pressurized fluid is supplied, narrows a gap formed between the sliding portion and the corresponding slide surface of the spool hole or abuts the corresponding slide surface.

In the seal structure, cross sections of the packing and the groove taken in the axis direction are preferably in bilateral symmetry in the axis direction. The groove is preferably defined by a bottom wall surface that the inner end of the packing abuts and also by a pair of side wall surfaces that rise in the radial direction from opposite ends, in the axis direction, of the bottom wall surface so as to oppose each other. In the radial direction, a depth of the groove from the bottom wall surface to the opening edge thereof is preferably made larger than a half of a height of the packing from the inner end to the outer end thereof. In the seal structure, it is more preferable that the bottom wall surface intersect a pair of the side wall surfaces at an angle of 90 degrees or less in the groove. It is even more preferable that in the axis direction, a maximum width of the inner end portion of the packing that is accommodated in the groove be made smaller than a minimum width of the groove between a pair of the side wall surfaces. In this case, the inner end of the packing may be fixed by an adhesive to the bottom wall surface of the groove.

In the seal structure, the packing preferably has a pair of side surfaces that are positioned opposite to each other in the axis direction and that extend parallel to each other so as to face opposite directions to each other, and a cross section of the packing taken in the axis direction is preferably in bilateral symmetry in the axis direction. The outer end portion of the packing preferably has an outer end surface that opposes the corresponding slide surface. The first sealing portion is preferably formed at one edge portion of the outer end surface, and the second sealing portion is formed at the other edge portion of the outer end surface. The one edge position is positioned opposite to the other edge portion in the axis direction. Here, it is more preferable that the first sealing portion be a first protrusion that protrudes from the outer end surface in the radial direction and that the second sealing portion be a second protrusion that protrudes from the outer end surface in the radial direction. It is even more preferable that in the radial direction, distances between the corresponding slide surface and tips of the first protrusion and the second protrusion be the same. In addition, the outer end surface of the packing is preferably formed so as to be parallel to the corresponding slide surface, and heights of the tips of the first protrusion and the second protrusion from the outer end surface are preferably the same. Moreover, the first protrusion and the second protrusion are preferably spaced from each other in the axis direction.

Here, the first protrusion and the second protrusion may be shaped like wedges with respective widths in the axis direction decreasing from the outer end surface toward the tips. Moreover, a labyrinth protrusion for forming a labyrinth seal may be formed on the outer end surface of the packing at a position between the first protrusion and the second protrusion. In addition, narrowing grooves may be formed in respective side surfaces of the packing so as to annularly surround the axis and so as to be in communication with the opening of the groove. Here, it is preferable that the narrowing grooves be formed of concave surfaces.

In addition, to solve the problem described above, the present invention can provide a spool-type switching valve that includes the seal structure. The switching valve has a housing in which the spool hole is formed. In addition, a gas supply port that forms a gas supply channel and is connected to a pressurized fluid source to supply a pressurized fluid, an output port that forms an output channel and outputs the pressurized fluid from the pressurized fluid source to an external pressurized fluid device, and a gas discharge port that forms a gas discharge channel and discharges exhaust gas from the pressurized fluid device are formed at outer surfaces of the housing.

Advantageous Effects of Invention

As described above, in the sealing structure according to the present invention, when the packing is accommodated in the groove of the land portion, the outside diameters of the first sealing portion and the second sealing portion of the packing are made smaller than the inside diameter of the corresponding slide surface of the spool hole. However, in a state in which the sliding portion of each land portion opposes the corresponding slide surface of the spool hole and a pressurized fluid is supplied from the gas supply channel to one of a pair of spaces in the spool hole partitioned by each land portion, an edge portion of the packing positioned near the space to which the pressurized fluid is supplied is elastically elongated in the radial direction due to pressure of the pressurized fluid, and one of the first sealing portion and the second sealing portion, which is positioned near the space to which the pressurized fluid is supplied, narrows a gap formed between the sliding portion and the corresponding slide surface of the spool hole or abuts the corresponding slide surface.

The spool may not operate for a long period of time without the pressurized fluid being supplied from the gas supply channel, in other words, the spool may stop for a long period of time in the state of the sliding surfaces of the land portions of the spool opposing respective slide surfaces of the spool hole. Even in this case, the sealing portions of each packing are not in contact with the sliding surface of the spool hole. This can prevent the physical deterioration or damage of the packing that is made of the elastic rubber member. In other words, this can prevent the packing from being deformed permanently or from being stuck to the slide surface of the spool hole. When the valve actuation unit moves the spool and thereby switches the communication state of the channels, the load exerted on the packing can be reduced effectively, and the frictional resistance between the packing and a corresponding slide surface can be also reduced effectively, even if the packing comes into contact with the opening edge of the corresponding channel recess. As a result, the spool can operate smoothly, and physical deterioration or damage of the packing can be effectively suppressed, which can extend the service life of the packing.

BRIEF DESCRIPTION OF DRAWINGS

FIG. 3(a) is an enlarged view of a portion M of the spool in FIG. 1 illustrating a state in which a sliding portion of a land portion of the spool does not oppose a slide surface of a spool hole. FIG. 3(b) is an enlarged view of a portion N of the spool in FIG. 2 illustrating a state in which the sliding portion of the land portion opposes the slide surface and a pressurized fluid is supplied from a gas supply channel to one of paired spaces (space S1) that are partitioned by the land portion in the spool hole.

FIG. 4(a) is an enlarged view of the portion M of the spool in FIG. 1 illustrating a state in which the sliding portion of the land portion of the spool does not oppose the slide surface of the spool hole. FIG. 4(b) is an enlarged view of the portion N of the spool in FIG. 2 illustrating a state in which the sliding portion of the land portion opposes the slide surface and the pressurized fluid is supplied from the gas supply channel to one of paired spaces (space S1) that are partitioned by the land portion in the spool hole.

FIG. 5(a) is an enlarged view of the portion M of the spool in FIG. 1 illustrating a state in which the sliding portion of the land portion of the spool does not oppose the slide surface of the spool hole. FIG. 5(b) is an enlarged view of the portion N of the spool in FIG. 2 illustrating a state in which the sliding portion of the land portion opposes the slide surface and the pressurized fluid is supplied through the gas supply channel to one of paired spaces (space S1) that are partitioned by the land portion in the spool hole.

DESCRIPTION OF EMBODIMENTS

Figure 1:
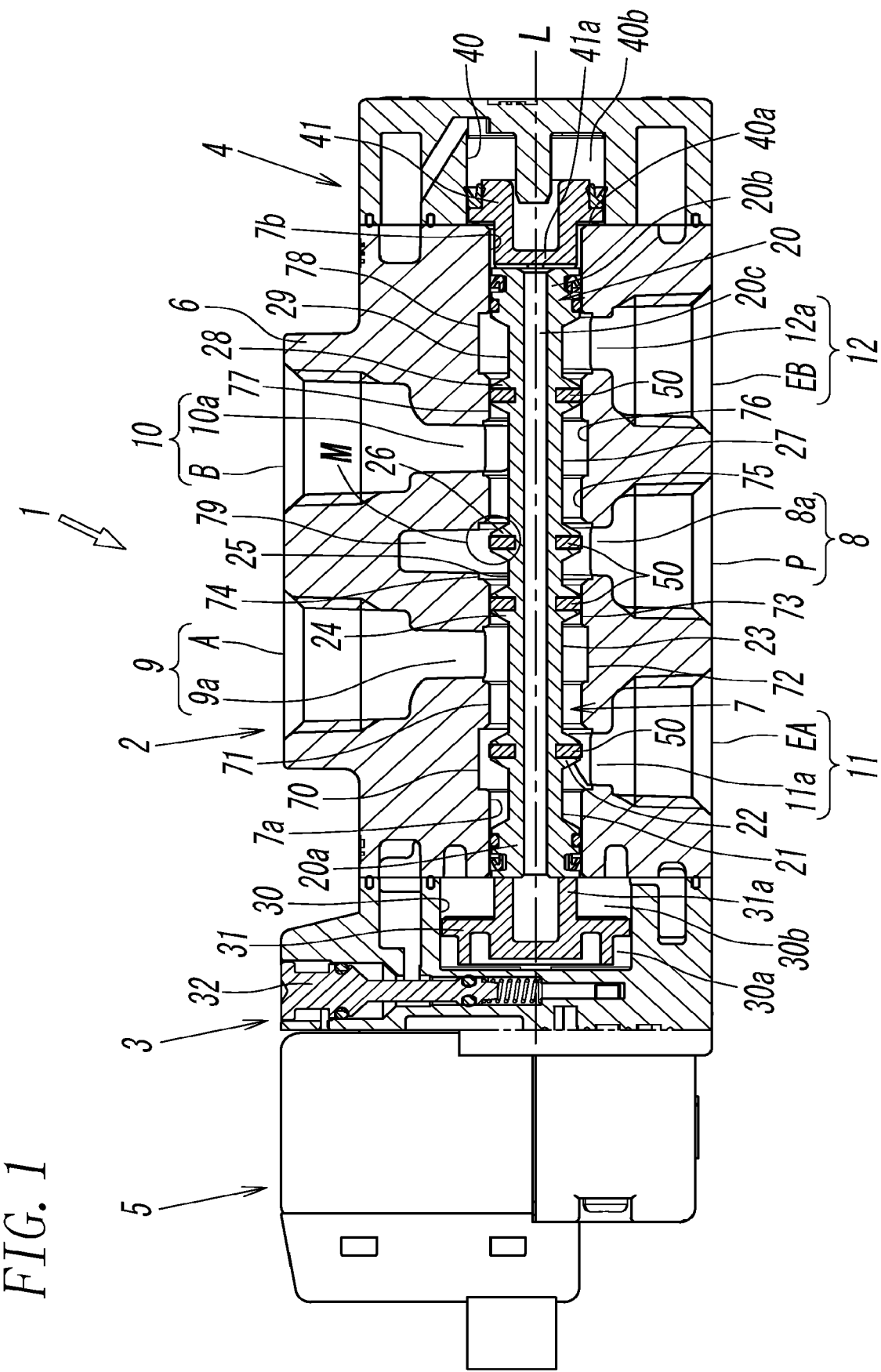
FIG. 1 is a schematic cross section of an embodiment of a spool-type switching valve according to the present invention, in which the spool-type switching valve is cut along the longitudinal axis thereof and a spool is switched to a first position.

A spool-type switching valve according to the present invention has a spool hole 7, a gas supply channel 8, output channels 9 and 10, and gas discharge channels 11 and 12, a spool 20, and a valve actuation unit 5. The spool hole 7 extends in a direction parallel to an axis L. The gas supply channel 8, the output channels 9 and 10, and the gas discharge channels 11 and 12 are in communication with the spool hole 7. The spool 20, which serves as a main valve, is inserted in the spool hole 7 so as to be able to slide in the axis L direction. The valve actuation unit 5 moves the spool 20. The spool-type switching valve 1 is configured such that the valve actuation unit 5 slides the spool 20 in the spool hole 7 and thereby switches the connection state of the output channels 9 and 10, which are to be connected to the gas supply channel 8 or to the gas discharge channels 11 and 12. The gas supply channel 8 serves to supply a pressurized fluid, such as compressed air, from a pressurized fluid source (for example, a compressor)(not illustrated) to the spool hole 7. The output channels 9 and 10 serve to output the pressurized fluid supplied to the spool hole 7 to various pressurized fluid devices (not illustrated), such as a pressurized fluid actuator (for example, a pneumatic cylinder), that are actuated by the pressurized fluid. The gas discharge channels 11 and 12 serve to discharge exhaust gas from the pressurized fluid device to the outside, for example, to the atmosphere.

Figure 2:
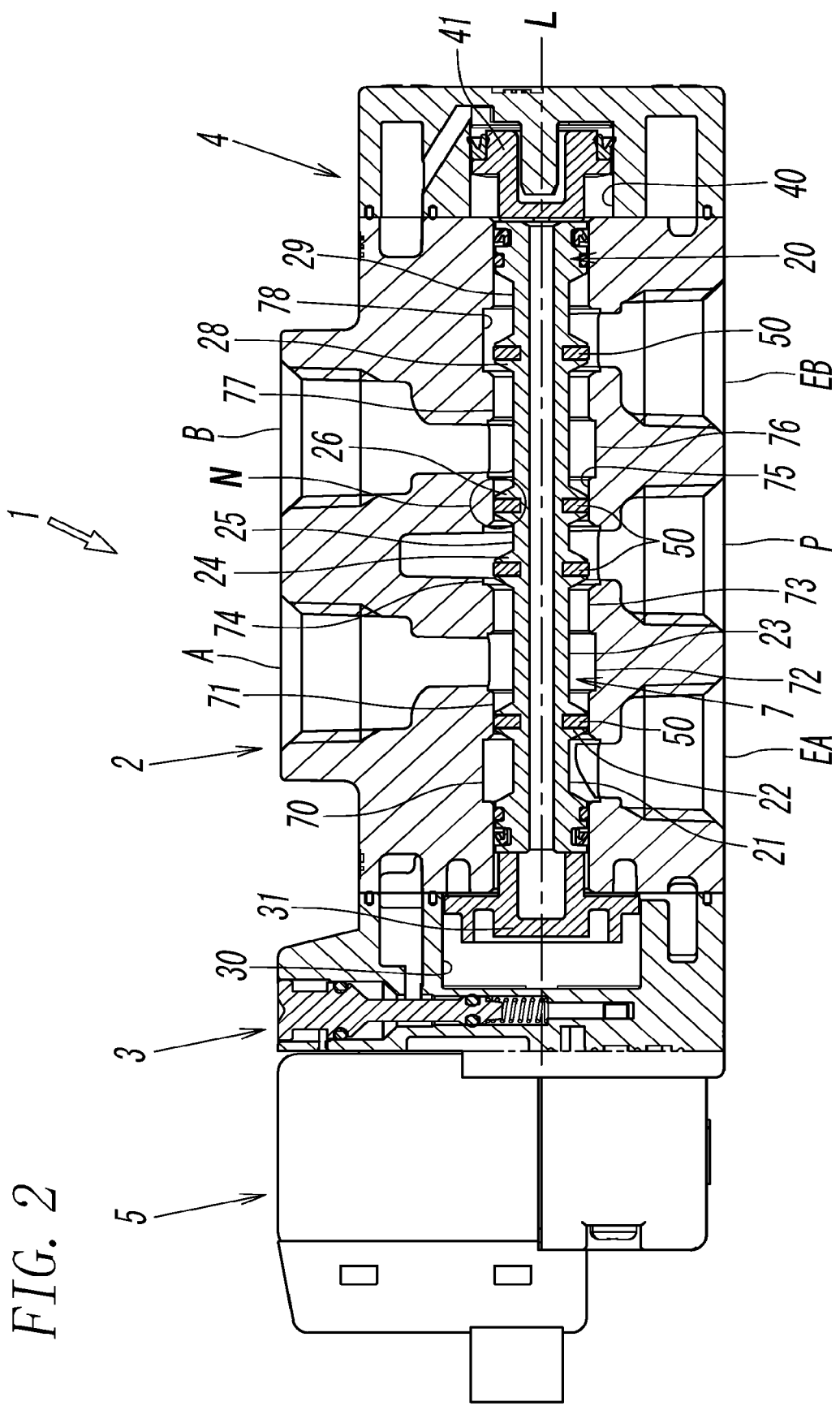
FIG. 2 illustrates the spool-type switching valve of FIG. 1 in a state in which the spool is switched to a second position.

More specifically, as illustrated in FIGS. 1 and 2, the spool-type switching valve 1 according to one embodiment of the present invention is an electromagnetic valve (a switching valve actuated by an electromagnetic pilot valve). The spool-type switching valve 1 is formed of a valve body 2, a first adapter 3 and a second adapter 4, and an electromagnetic pilot valve unit that is the above-described valve actuation unit 5. The valve body 2 has the spool hole 7, the gas supply channel 8, the output channels 9 and 10, the gas discharge channels 11 and 12, and the spool 20. The first adapter 3 and the second adapter 4 are connected to respective opposite end surfaces of the valve body 2 in the axis L direction. The electromagnetic pilot valve unit is connected to a surface of the first adapter 3 that is opposite to the surface connected to the valve body 2.

The valve body 2 has a housing 6 that is integrally made of a resin or a metal and shaped like a cuboid. The spool hole 7 is formed in the housing 6 so as to pass longitudinally through the housing 6 between the opposite end surfaces. As viewed in plan, the output channels 9 and 10 are formed at the upper surface of the housing 6 where output ports A and B open. The output ports A and B are connected to piping from the pressurized fluid device. The gas supply channel 8 is formed at the bottom surface (lower surface) of the housing 6. The bottom surface extends so as to annularly surround the axis together with the upper surface, and a gas supply port P opens at the bottom surface. The gas discharge channels 11 and 12 are also formed at the bottom surface where gas discharge ports EA and EB open. The gas supply port P is to be connected to a fluid channel (or piping) from the pressurized fluid source. The gas discharge ports EA and EB are to be connected to fluid channels (or piping) for discharging the exhaust gas returning from the pressurized fluid device to the outside through the output ports A and B.

The output ports A and B are in communication with the spool hole 7 through respective output communication channels 9a and 10a. The output communication channels 9a and 10a have cross-sectional areas smaller than those of the output ports A and B. The output ports A and B and the output communication channels 9a and 10a form the output channels 9 and 10. The gas supply port P is in communication with the spool hole 7 through a gas supply communication channel 8a. The gas supply communication channel 8a has a cross-sectional area smaller than that of the gas supply port P. The gas supply port P and the gas supply communication channel 8a form the gas supply channel 8. In addition, the gas discharge ports EA and EB are in communication with the spool hole 7 through respective gas discharge communication channels 11a and 12a. The gas discharge communication channels 11a and 12a have cross-sectional areas smaller than those of the gas discharge ports EA and EB. The gas discharge ports EA and EB and the gas discharge communication channels 11a and 12a form the gas discharge channel 11 and 12.

Put more specifically, the spool-type switching valve 1 has five ports, in other words, the gas supply port P, the first and second output port A and B arranged side by side in the longitudinal direction of the housing 6, and the first and second gas discharge port EA and EB disposed with the gas supply port P interposed therebetween in the longitudinal direction of the housing 6. The spool 20 is configured to be selectively moved between a first position and a second position by switching on or off the electromagnetic pilot valve unit 5 (i.e., valve actuation unit 5). When the spool 20 is in the first position (see FIG. 1), the gas supply port P is connected to the second output port B, and simultaneously the first output port A is connected to the first gas discharge port EA. On the other hand, when the spool 20 is in the second position (see FIG. 2), the gas supply port P is connected to the first output port A, and simultaneously the second output port B is connected to the second gas discharge port EB.

In the spool hole 7, the following portions are formed annularly on the inner peripheral surface of the spool hole 7 with the axis L as the center: a first support portion 7a, a first channel recess 70, a first slide surface 71, a second channel recess 72, a second slide surface 73, a third channel recess 74, a third slide surface 75, a fourth channel recess 76, a fourth slide surface 77, a fifth channel recess 78, and a second support portion 7b, as listed in the order from an end opening of the spool hole 7 at which the first adapter 3 is attached to the other end opening at which the second adapter 4 is attached in the axis L direction. In other words, the slide surfaces and the channel recesses are formed alternately along the axis L on the inner peripheral surface of the spool hole 7.

Here, the first and second support portions 7a and 7b and the first to fourth slide surfaces 71, 73, 75, and 77 have the same inside diameter DO. The bottom surfaces of the first, third, and fifth channel recesses 70, 74, and 78 have the same inside diameter D1. In addition, the bottom surfaces of the second and fourth channel recesses 72 and 76 have the same inside diameter D2. The inside diameter D1 is slightly larger than the inside diameter D2, and the inside diameters D1 and D2 are larger than the inside diameter DO of the slide surfaces and the support portions and are smaller than the width of the housing 6. As illustrated in FIGS. 3 to 6, a tapered portion T is formed at an opening edge of a channel recess so as to expand the width of the channel recess toward the opening of the spool hole. More specifically, the tapered portion T is formed at an opening edge of the first channel recess 70 at the border with the first slide surface 71. Similarly, the tapered portions T are formed at respective opening edges of the third channel recess 74 at the border with the second and third slide surfaces 73 and 75, and the tapered portion T is also formed at an opening edge of the fifth channel recess 78 at the border with the fourth slide surface 77.

The first support portion 7a and the second support portion 7b, which are portions of the inner peripheral surface of the spool hole 7, supports one end (first pressed portion 20a) and the other end (second pressed portion 20b) of the spool 20 in a slidable and gas-tight manner. The communication channel 11a of the first gas discharge channel 11 is connected to the bottom surface of the first channel recess 70. The communication channel 9a of the first output channel 9 is connected to the bottom surface of the second channel recess 72. The communication channel 8a of the gas supply channel 8 is connected to the bottom surface of the third channel recess 74. The communication channel 10a of the second output channel 10 is connected to the bottom surface of the fourth channel recess 76. The communication channel 12a of the second gas discharge channel 12 is connected to the bottom surface of the fifth channel recess 78. Reference sign 79 in the drawings denotes a pilot fluid supply hole that is in communication with the gas supply channel 8. The pilot fluid supply hole serves to supply a pilot fluid through a pilot fluid channels (not illustrated) to the first adapter 3 via the valve actuation unit 5 and also to the second adapter 4.

Regarding the spool 20, the following portions are formed annularly on the surface of the spool 20 with the axis L as the center: the first pressed portion 20a, a first annular recess 21, a first land portion 22, a second annular recess 23, a second land portion 24, a third annular recess 25, a third land portion 26, a fourth annular recess 27, a fourth land portion 28, a fifth annular recess 29, and the second pressed portion 20b, as listed in the order from one end of the spool 20 near the first adapter 3 to the other end thereof near the second adapter 4 in the axis L direction. The first pressed portion 20a and the second pressed portion 20b engage the first support portion 7a and the second support portion 7b, respectively, in a gas-tight and slidable manner. The above portions are formed around the axis L in an annular and coaxial manner. In other words, the annular recesses and the land portions are formed alternately along the axis L on the spool 20.

Each of the land portions 22, 24, 26, and 28 is shaped as an isosceles trapezoid of which the width in the axis L direction gradually decreases as the height in the radial direction Y increases. In other words, the width in the axis L direction gradually decreases from the base end of the land portion positioned at the border with the adjacent annular recess toward a sliding portion formed at the outer end of the land portion. Each land portion is formed in bilateral symmetry in the axis L direction with respect to the radially extending central axis of the land portion. Each of the land portions 22, 24, 26, 28 has a groove 15 that is annularly formed in the outer end thereof (see FIGS. 3 to 6). An annular packing 50, which will be described in detail later, is fitted in the groove 15 formed in the outer end of each of the land portions 22, 24, 26, and 28.

Accordingly, when each of the land portions is positioned at a corresponding slide surface of the spool hole 7 and the sliding portion of the outer end of the land portion opposes the slide surface of the spool hole 7, the packing 50 seals a gap between the sliding portion of the land portion and the slide surface of the spool hole 7, which reduces or prevents leakage of the pressurized fluid through the gap. The first and second pressed portions 20a and 20b and the first to fourth land portions 22, 24, 26, and 28 have the same outside diameter D3 in a state of seal members (such as packings 50) being not attached, whereas the first to fifth annular recess 21, 23, 25, 27, and 29 have the same outside diameter D4. The outside diameter D3 is larger than the outside diameter D4 but slightly smaller than the inside diameter DO of the slide surfaces of the spool hole 7.

The first adapter 3 has a first cylinder hole 30 that is formed along the axis L so as to have a diameter larger than that of the spool hole 7 and that opens toward the valve body 2. The first adapter 3 also has a first piston 31 that is engaged with the first cylinder hole 30 gas-tightly so as to be slidable in the axis L direction. The cylinder hole 30 is partitioned gas-tightly by the piston 31 into two chambers, in other words, a first chamber 30a positioned closer than the piston 31 to the valve actuation unit 5 and a second chamber 30b positioned closer to the valve body 2. The first piston 31 has a first pressing portion 31a that is formed integrally with the first piston 31 and disposed coaxially with the spool 20 at a position near the valve body 2. The first pressing portion 31a has a diameter smaller than that of the first support portion 7a of the spool hole 7. The first pressing portion 31a abuts the first pressed portion 20a of the spool 20. The first chamber 30a is connected to the pilot valve of the valve actuation unit 5, whereas the second chamber 30*b* is open to the atmosphere. Reference sign 32 in the drawings denotes a manual operation device for discharging the pressurized fluid filled in the first chamber 30*a*. The manual operation device is to be pressed downward manually.

The second adapter 4 has a second cylinder hole 40 that is formed along the axis L so as to have a diameter larger than that of the spool hole 7 and smaller than that of the first cylinder hole 30. The second cylinder hole 40 opens toward the valve body 2. The second adapter 4 also has a second piston 41 that is engaged with the second cylinder hole 40 gas-tightly so as to be slidable in the axis L direction. The cylinder hole 40 is partitioned gas-tightly by the piston 41 into two chambers, in other words, a first chamber 40*a* positioned closer than the piston 41 to the valve body 2 and a second chamber 40*b* positioned opposite to the valve body 2. The diameter of the first piston 31 is made larger than that of the second piston 41, and accordingly the pressure-receiving area of the first piston 31 that faces the first chamber 30*a* is made larger than the pressure-receiving area of the second piston 41 that faces the second chamber 40*b*.

The second piston 41 has a second pressing portion 41*a* that is formed integrally with the second piston 41 and disposed coaxially with the spool 20 at a position near the valve body 2. The second pressing portion 41*a* has a diameter smaller than that of the second support portion 7*b* of the spool hole 7. The second pressing portion 41*a* abuts the second pressed portion 20*b* of the spool 20. The first chamber 40*a* of the second cylinder hole 40 is in communication with the second chamber 30*b* of the first cylinder hole 30 through a through-hole 20*c* that passes through a center portion of the spool 20 in the axis L direction, and accordingly the first chamber 40*a* is open to the atmosphere. On the other hand, the second chamber 40*b* is always in communication with the pilot fluid supply hole 79 and pressurized with the pilot fluid. As a result, the spool 20 is continuously pressed in the axis L direction toward the first adapter 3 (i.e., toward the first piston).

Note that the shapes of the support portions, channel recesses, and slide surfaces of the spool hole 7, the shapes of the pressed portions, land portions, and annular recesses of the spool 20, and the shapes of the cylinder holes 30 and 40 and the pistons 31 and 41 may be circular or oval, or like a running track, in respective cross sections that orthogonally intersect the axis L. In relation to a shape peripherally formed around the axis L, a length of a cord that perpendicularly crosses the axis L is generally referred to as a "diameter" for convenience, and a distance from the axis L to the outer periphery is generally referred to as a "radius" in the present specification.

Next, operation of the spool-type switching valve 1 will be described with reference to FIGS. 1 and 2. As illustrated in FIG. 1, when the electromagnetic pilot valve unit that constitutes the valve actuation unit 5 is in the OFF state, the first chamber 30*a* of the first cylinder hole 30 is open to the atmosphere. Accordingly, the second piston 41 is pressed, and thereby moved together with the spool 20 and the first piston 31, toward the stroke end in the first chamber 30*a*, which switches the spool 20 to the first position. In this state, with respect to the axis L direction, the first land portion 22 of the spool 20 is disposed at the first channel recess 70 of the spool hole 7, the second land portion 24 is disposed at the second slide surface 73, the third land portion 26 is disposed at the third channel recess 74, and the fourth land portion 28 is disposed at the fourth slide surface 77.

In other words, in the spool hole 7, the second land portion 24 blocks communication between the first output port A of the first output channel 9 and the gas supply port P of the gas supply channel 8, and simultaneously, the fourth land portion 28 blocks communication between the second output port B of the second output channel 10 and the second gas discharge port EB of the second gas discharge channel 12. In this positional relationship between the spool hole 7 and the spool 20, the first output channel 9 and the first gas discharge channel 11 are communicated with each other through the spool hole 7, and the second output channel 10 and the gas supply channel 8 are also communicated with each other through the spool hole 7. In this state, the second gas discharge channel 12 is closed in the spool hole 7.

On the other hand, as illustrated in FIG. 2, when the electromagnetic pilot valve unit that constitutes the valve actuation unit 5 is in the ON state, the pilot fluid is supplied through the valve actuation unit 5 to the first chamber 30*a* of the first cylinder hole 30. Accordingly, the first piston 31 is pressed, and thereby moved together with the spool 20 and the second piston 41, toward the stroke end in the second chamber 40*b* of the second cylinder hole 40 against the pressing force of the second piston 41. As a result, the spool 20 is switched to the second position. In this state, with respect to the axis L direction, the first land portion 22 of the spool 20 is disposed at the first slide surface 71 of the spool hole 7, the second land portion 24 is disposed at the third channel recess 74, the third land portion 26 is disposed at the third slide surface 75, and the fourth land portion 28 is disposed at the fifth channel recess 78.

In other words, in the spool hole 7, the first land portion 22 blocks communication between the first output port A of the first output channel 9 and the first gas discharge port EA of the first gas discharge channel 11, and simultaneously, the third land portion 26 blocks communication between the second output port B of the second output channel 10 and the gas supply port P of the gas supply channel 8. In this positional relationship between the spool hole 7 and the spool 20, the first output channel 9 and the gas supply channel 8 are communicated with each other through the spool hole 7, and the second output channel 10 and the second gas discharge channel 12 are also communicated with each other through the spool hole 7. In this state, the first gas discharge channel 11 is closed in the spool hole 7.

Embodiments of a seal structure between the spool 20 and the spool hole 7 will be described more specifically with reference to FIGS. 3 to 6. Note that the following description focuses on the seal structure between the third land portion 26 and the spool hole 7, which is illustrated in a portion M of FIG. 1 and in a portion N of FIG. 2. In the following description, the third land portion 26 will be simply referred to as the "land portion 26", the fourth annular recess 27 will be simply referred to as the "annular recess 27", the third channel recess 74 will be simply referred to as the "channel recess 74", and the third slide surface 75 will be simply referred to as the "slide surface 75". The other seal structures between the spool hole 7 and the first, second, and fourth land portions 22, 24 and 28 are substantially the same as that of the third land portion 26, and duplicated descriptions will be omitted.

In seal structures according to embodiments of the present invention, an outer peripheral surface 26*a* of the land portion 26 of the spool 20, which serves as the sliding portion, is formed so as to be substantially parallel to the above-described slide surface 75. The groove 15 is formed at the outer peripheral surface 26*a* of the land portion 26 at the center in the axis L direction so as to annularly surround the axis L and open in the radial direction Y. The packing 50 is fitted in the groove 15. The material of the packing 50 is not specifically limited insofar as the packing 50 is an elastic rubber member that can perform the sealing function. For example, the packing 50 may be made of nitrile rubber or fluoro rubber.

The groove 15 is defined by a bottom wall surface 15*a*, a first sidewall surface 15*b* formed on a side closer to the first pressed portion 20*a*, and a second sidewall surface 15*c* formed on a side closer to the second pressed portion 20*b*. The bottom wall surface 15*a* is formed so as to annularly surround the axis L and extend flatly in the axis L direction. The first sidewall surface 15*b* and the second sidewall surface 15*c*, which oppose each other, extend in the radial direction Y (a direction perpendicular to the axis L) from respective opposite ends of the bottom wall surface 15*a*, which are positioned opposite to each other in the axis L direction. In other words, the outer peripheral surface 26*a* orthogonally intersects a pair of the side wall surfaces 15*b* and 15*c* that are formed as flat surfaces parallel to each other, which thereby forms the opening of the groove 15. The cross section of the groove 15 cut along the axis L is shaped like a rectangle of bilateral symmetry in the axis L direction with respect to the central axis extending in the radial direction Y.

The bottom wall surface 15*a* of the groove 15 is formed so as to have a diameter D5. Accordingly, the distance between the outer peripheral surface 26*a* and the bottom wall surface 15*a* (which is equal to (D3−D5)/2) corresponds to the depth Hg of the groove 15. The groove 15 in the land portion 26 has a constant depth Hg over the entire circumferential length of the groove 15. In addition, the groove 15 is formed so as to have a constant groove width Wg in the axis L direction over the entire depth of the groove 15 from the opening to the bottom wall surface 15*a*. The groove 15, however, is not limited to the above configuration. For example, the pair of the side wall surfaces 15*b* and 15*c* may intersect the bottom wall surface 15*a* and the outer peripheral surface 26*a* at acute angles, and the groove 15 may have a cross-sectional shape substantially of an isosceles trapezoid with the groove width Wg gradually decreasing from the bottom wall surface 15*a* toward the opening.

The packing 50 is formed so as to have the inside diameter smaller than the diameter D5 of the bottom wall surface 15*a* of the groove 15 when the packing 50 is not attached to the groove 15, in other words, in an unused state. In other words, the circumferential length of the inner peripheral surface (i.e., inner end surface) 50*a* of the packing 50 is made shorter than the circumferential length of the bottom wall surface 15*a* of the groove 15. Accordingly, in the state of the packing 50 being fitted in the groove 15 as illustrated in FIGS. 3 to 6, the packing 50 made of an elastic rubber member is elongated in the circumferential direction, which causes the inner peripheral surface 50*a* of the packing 50 to be elastically pressed against the bottom wall surface 15*a* of the groove 15. This ensures sealing between the inner peripheral surface 50*a* of the packing 50 and the bottom wall surface 15*a* of the groove 15.

The following description is based on the state in which the packing 50 is installed in the groove 15.

Figure 3:
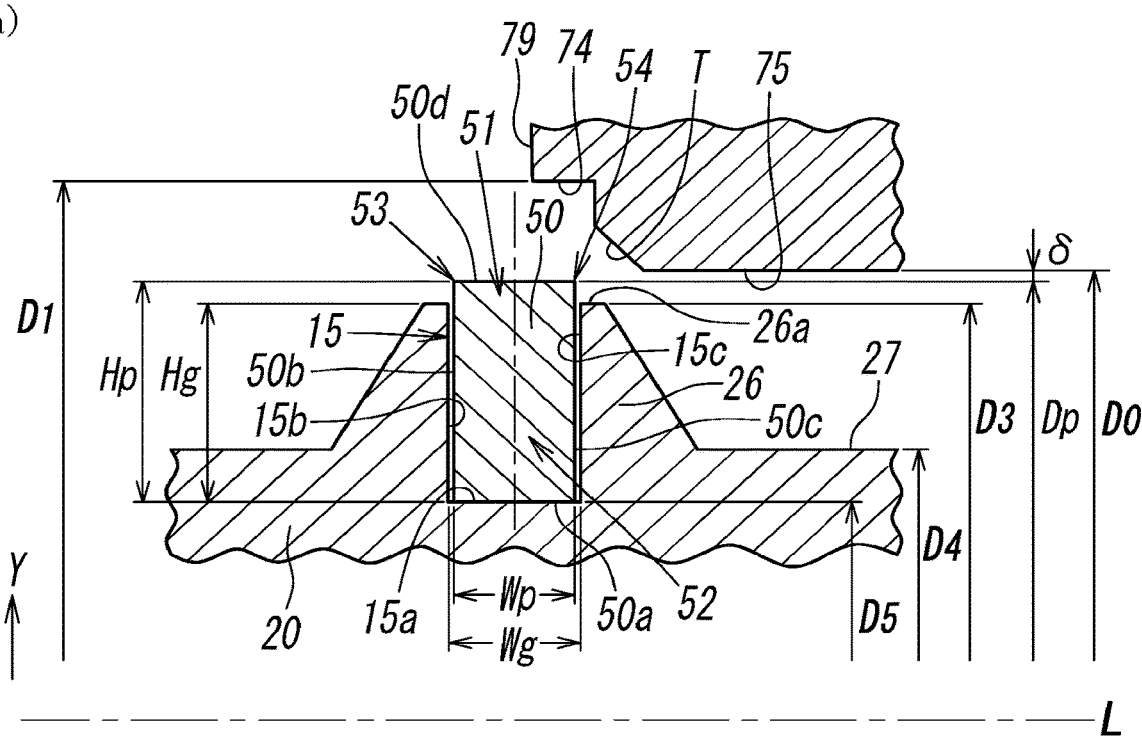
FIG. 3 are schematic cross-sectional views illustrating a first embodiment of a seal structure according to the present invention.
Figure 3:
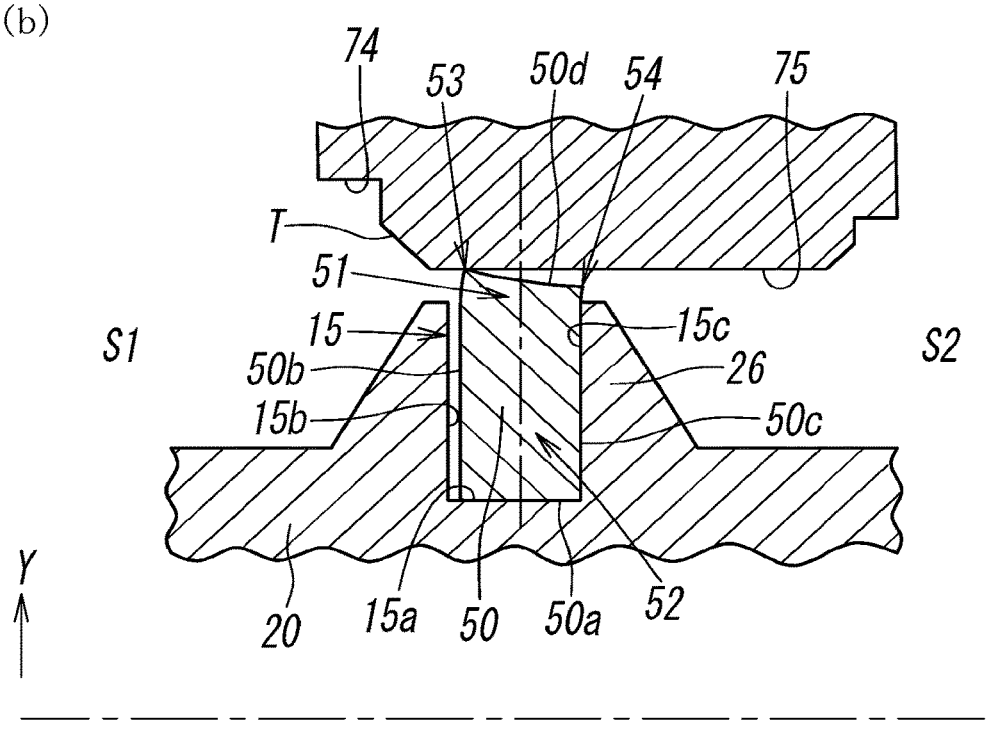

In the seal structure according to the first embodiment illustrated in FIG. 3, the cross section of the packing 50 cut along the axis L is shaped substantially like a solid rectangle of bilateral symmetry in the axis L direction with respect to the central axis extending in the radial direction Y. As illustrated, the external shape of the packing 50 is formed of four surfaces, in other words, the inner end surface 50*a*, an outer end surface 50*d*, a first side surface 50*b*, and a second side surface 50*c*. The inner end surface 50*a* is the inner peripheral surface of the packing 50 and is formed annularly so as to surround the axis L and extend flatly in the axis L direction. The outer end surface 50*d* is the outer peripheral surface of the packing 50 and is formed annularly around the axis L and extend flatly in the axis L direction. The first side surface 50*b* extends in the radial direction Y so as to oppose the first sidewall surface 15*b* of the groove 15 and so as to connect one end of the inner end surface 50*a* to one end of the outer end surface 50*d*. The second side surface 50*c* extends in the radial direction Y so as to oppose the second sidewall surface 15*c* of the groove 15 and so as to connect the other end of the inner end surface 50*a* to the other end of the outer end surface 50*d*. Here, the one end and the other end are opposite to each other in the axis L direction. The entire surface of the inner end surface 50*a* is in pressed contact with the bottom wall surface 15*a* of the groove 15. The inner end surface 50*a* extends parallel to the outer end surface 50*d* and annularly surround the axis L. A pair of the side surfaces 50*b* and 50*c*, which are formed as flat surfaces and extend parallel to each other and annularly surround the axis L, orthogonally intersect the inner end surface 50*a* and the outer end surface 50*d*.

When the outside diameter of the packing 50 that is fitted in the groove (i.e., the diameter of the outer end surface 50*d* in the first embodiment) is denoted by Dp, the dimension of the packing 50 between the outer end surface 50*d* and the inner end surface 50*a* that is pressed against the bottom wall surface 15*a*, in other words, the height Hp of the packing 50 in the radial direction Y (which is equal to (Dp−D5)/2), is made larger than the depth Hg of the groove 15. An outer end portion 51 of the packing 50 is a portion that includes the outer end surface 50*d* and has a height equal to Hp−Hg. The outer end portion 51 protrudes in the radial direction Y from the outer peripheral surface (sliding portion) 26*a* of the land portion 26. An inner end portion 52 of the packing 50, which is a portion that includes the inner end surface 50*a* and has a height equal to Hg, is accommodated in the groove 15. Here, it is desirable that the depth Hg of the groove 15 be greater than a half of the entire height Hp of the packing 50. The packing 50 thereby prevented from coming off the groove 15.

In the seal structure of the first embodiment, the packing 50 is formed so as to have a constant width Wp in the axis L direction over the entire length from the inner end surface 50*a* toward the outer end surface 50*d* in the radial direction Y. In addition, the width Wp is set to be smaller than the width Wg of the groove 15. In the present invention, a maximum width Wpmax of the inner end portion 52 of the packing 50 accommodated in the groove 15 is formed so as to be smaller than a minimum width Wgmin of the groove 15. Accordingly, the packing 50 can move, due to the fluid pressure, in the axis L direction between the first sidewall surface 15*b* and the second sidewall surface 15*c* of the groove 15.

In addition, the outside diameter Dp of the outer end surface 50*d* of the packing 50 is set to be slightly smaller than the inside diameter DO of the slide surface 75 of the spool hole 7. An edge portion of the packing 50 positioned near the first side surface 50*b* of the outer end portion 51 forms a first sealing portion 53 that extends annularly around the axis L. Similarly, an edge portion of the packing 50 positioned near the second side surface 50*c* forms a second sealing portion 54 that extends annularly around the axis L. The first sealing portion 53 includes the right-angled corner at which the outer end surface 50*d* intersects the first side surface 50*b*, and the second sealing portion 54 includes the right-angled corner at which the outer end surface 50*d* intersects the second side surface 50*c*.

When the sliding portion of each of the land portions 22, 24, 26, and 28 opposes a corresponding one of the slide surfaces 71, 73, 75, and 77 of the spool hole 7, and when the pressurized fluid is supplied from the gas supply channel 8 to one of the paired spaces S1 and S2 (see FIG. 3(b) to FIG. 5(b)) partitioned by each of the land portions 22, 24, 26, and 28 in the spool hole 7, the fluid pressure of the pressurized fluid deforms the packing 50 to cause the packing 50 to adequately seal the gap between the sliding portion of each land portion and the corresponding slide surface of the spool hole 7. More specifically, the packing 50 is deformed elastically due to the fluid pressure of the pressurized fluid supplied to one of the spaces S1 and S2. This causes one of the first and second sealing portions 53 and 54, which is positioned closer to the fluid-filled space, to narrow the gap $\delta$ (which is equal to (D0−Dp)/2) between the sliding portion of the land portion and the slide surface of the spool hole or to abut the slide surface of the spool hole. As a result, the packing 50 adequately seals the gap between the surface of the sliding portion and the slide surface.

This sealing mechanism of the seal structure will be described more specifically using the land portion 26 of FIG. 3 as an example. When the spool 20 is switched to the first position as illustrated in FIG. 1, the land portion 26 is disposed at the channel recess 74 as illustrated in FIG. 3(a), and the sliding portion 26a of the land portion 26 does not oppose the slide surface 75. Accordingly, the packing 50 is not deformed nor moved in the groove 15, and the land portion 26 allows the pressurized fluid, which is supplied from the gas supply channel 8 to the spool hole 7, to be output through a channel formed between the annular recess 27 of the spool 20 and the slide surface 75 of the spool hole 7.

Next, switching the state of the valve actuation unit 5 causes the spool 20 to move from the first position to the second position illustrated in FIG. 2. The land portion 26 and the packing 50 are also moved together from the position in FIG. 3(a) to the position in FIG. 3(b). In the state of the spool being switched to the second position, the sliding portion 26a of the land portion 26 opposes the slide surface 75 of the spool hole 7. In other words, the entire outer end surface 50d, including both seal portions 53 and 54, of the packing 50 installed in the land portion 26 opposes the slide surface 75. In this state, the land portion 26 partitions space in the spool hole 7 into a first space S1 communicating with the gas supply channel 8 and a second space S2 communicating with the gas discharge channel 12.

In this state, the pressurized fluid is supplied to the first space S1 from the gas supply channel 8, and the fluid pressure causes the packing 50 to move to the second sidewall surface 15c in the groove 15. As a result, the second side surface 50c of the packing 50 is pressed against the second sidewall surface 15c. Simultaneously, in FIG. 3(b), the fluid pressure generates a clockwise moment exerted on the packing 50 with the opening edge of the second sidewall surface 15c being as the center of rotation. Consequently, the edge portion of the packing 50 near the first space S1, which includes the first side surface 50b and the first sealing portion 53, is elastically elongated in the radial direction Y (i.e., toward the slide surface 75 of the spool hole 7). As a result, the first sealing portion 53 (especially the corner portion) narrows the gap $\delta$ formed between the first sealing portion 53 and the slide surface 75 or abuts the slide surface 75. Leakage of the pressurized fluid from the first space S1 to the second space S2 is thereby reduced effectively, which ensures the sealing between the spaces S1 and S2.

In the process of the land portion 26 moving from the position of FIG. 3(a) to the position of FIG. 3(b), the packing 50 of the land portion 26 crosses a border portion between the channel recess 74 and the slide surface 75 of the spool hole 7 (i.e., a tapered portion T formed at the opening edge of the channel recess 74) and moves to the position at which the packing 50 in the land portion 26 opposes the slide surface 75. At this moment, the second sealing portion 54 of the packing 50 first comes to oppose the slide surface 75, and then the first sealing portion 53 comes to oppose the slide surface 75. Here, the outside diameter Dp of the packing 50 is smaller than the inside diameter DO of the slide surface 75 of the spool hole 7, and accordingly at least the second sealing portion 54 moves to the position of opposing the slide surface 75 without coming into contact with the border portion. In the state of the second sealing portion 54 opposing the slide surface 75, the fluid pressure of the pressurized fluid is expected to press the second side surface 50c of the packing 50 against the second sidewall surface 15c of the groove 15 before the first sealing portion 53 crosses the border portion (the tapered portion T). In addition, the fluid pressure of the pressurized fluid is expected to elastically deform and elongate, in the radial direction Y, the edge portion of the packing 50 including the first side surface 50b and the first sealing portion 53.

Here, the outside diameter of the first sealing portion 53 (especially the right-angled corner portion between the outer end surface 50d and the first side surface 50b) may become larger than the inside diameter DO of the slide surface 75, and the first sealing portion 53 may hit the border portion and run up onto the slide surface 75. Even in this case, the amount of deformation of the packing 50 occurring in this event is relatively small compared with a known configuration, and forces acting on the packing 50 in this event act against the elastic deformation caused by the fluid pressure. As a result, the load exerted on the packing 50 in this event can be effectively reduced, and the sliding resistance between the packing 50 and the slide surface 75 can be also reduced.

According to the above-described seal structure of the first embodiment, when the communication state of the channels 8, 9, 10, 11, and 12 is switched by moving the spool 20 selectively between the first position and the second position, the load exerted on the packing 50 of each of the land portions 22, 24, 26, and 28 can be reduced effectively, and the frictional resistance between the packing 50 and a corresponding one of the slide surfaces 71, 73, 75, and 77 can be also reduced effectively, even if the packing 50 elastically deforms due to the fluid pressure of the pressurized fluid and comes into contact with a corresponding one of the opening edges (tapered portions T) of the channel recesses 70, 74, and 78. As a result, the spool 20 can operate smoothly, and physical deterioration or damage of the packing 50 can be effectively suppressed, which can extend the service life of the packing 50.

In addition, the spool 20 may not operate for a long period of time without the pressurized fluid being supplied from the gas supply channel 8, in other words, the spool 20 may stop for a long period of time in the state of the sliding surfaces of the land portions of the spool 20 opposing respective slide surfaces of the spool hole 7. Even in this case, the sealing portions 53 and 54 of each packing 50 are not in contact with the sliding surface of the spool hole 7. This can prevent the physical deterioration or damage of the packing 50 that is made of the elastic rubber member. In other words, this can prevent the packing 50 from being deformed permanently or from being stuck to the slide surface of the spool hole 7.

Moreover, during the assembly of the spool-type switching valve, it is not necessary to additionally process (e.g., chamfer) the opening of the spool hole 7 of the housing 6 so as to enable the spool 20 to be inserted smoothly into the spool hole 7.

A second embodiment of the seal structure according to the present invention will be described with reference to FIG. 4. The same elements as those described in the first embodiment are denoted by the same reference signs. Descriptions of the same elements as well as the same advantageous effects will be omitted to avoid duplication.

The seal structure of the second embodiment is different from that of the first embodiment mainly in that the first and second sealing portions formed at the outer end portion 51 of the packing are configured differently. In the second embodiment, as illustrated in FIG. 4(a), the first sealing portion is formed as an annular first protrusion 53a that is formed integrally with a packing 50A. The first protrusion 53a protrudes in the radial direction Y from the outer end surface 50d of the packing 50A at the edge portion near the first side surface 50b. The second sealing portion is formed as an annular second protrusion 54a that is formed integrally with a packing 50A. The second protrusion 54a protrudes in the radial direction Y from the outer end surface 50d at the edge portion near the second side surface 50c. In other words, the protrusions 53a and 54a are formed at opposite ends of the outer end surface 50d so as to be spaced from each other in the axis L direction with a flat portion of the outer end surface 50d interposed therebetween.

In a cross section along the axis L, the packing 50A having the first protrusion 53a and the second protrusion 54a is also shaped in bilateral symmetry in the axis L direction with respect to the central axis extending in the radial direction Y. Accordingly, distances of the tips of the protrusions 53a and 54a from the outer end surface 50d are the same, and distances 8 of the tips of the protrusions 53a and 54a from the slide surface 75 of a spool hole 7 are also the same. In the second embodiment, the outside diameter Dp of the packing 50A is defined as two times the distance of the tips of the protrusions 53a and 54a from the axis L.

In addition, each of the protrusions 53a and 54a of the packing 50A is shaped like a wedge in which the width in the axis L direction gradually decreases from the base end positioned on the outer end surface 50d of the packing 50A toward the tip end thereof positioned near the slide surface 75 of the spool hole 7. More specifically, the first protrusion 53a has an outer wall that forms part of the first side surface 50b and orthogonally intersects the outer end surface 50d. The first protrusion 53a also has an inner wall that stands on the outer end surface 50d so as to incline toward the first side surface 50b. The second protrusion 54a has an outer wall that serves as part of the second side surface 50c and orthogonally intersects the outer end surface 50d. The second protrusion 54a also has an inner wall that stands on the outer end surface 50d so as to incline toward the second side surface 50c. In other words, the packing 50A of the second embodiment is formed such that the packing 50 of the first embodiment has a recess formed at the center of the outer peripheral surface in the axis L direction and the recess has a cross-sectional shape of an inverted isosceles trapezoid of which the bottom is positioned on the outer end surface 50c1. The tips of the first and second protrusions 53a and 54a form corners with acute angles with respect to the corresponding first and second side surface 50b and 50c.

In the seal structure using the packing 50A according to the second embodiment, when the spool 20 is switched from the first position (see FIG. 1) to the second position (see FIG. 2), the fluid pressure in the first space S1 causes the first and second protrusions 53a and 54a (which serve as the first and second sealing portions) to narrow the gap 6 (which is equal to (D0−Dp)/2) between the packing 50A and the slide surface 75 or to abut the slide surface 75 due to the same mechanism as described in the first embodiment (see FIG. 4(b)). As a result, the packing 50A can adequately seal the gap between the slide surface 75 of the spool hole 7 and the sliding surface 26a of the land portion 26.

Next, a third embodiment of the seal structure according to the present invention will be described with reference to FIG. 5. The same elements as those described in the first and second embodiments are denoted by the same reference signs. Descriptions of the same elements as well as the same advantageous effects will be omitted to avoid duplication.

In the seal structure according to the third embodiment, as illustrated in FIG. 5(a), a first narrowing groove 55a is annularly formed in the first side surface 50b of a packing 50B, and a second narrowing groove 55b is annularly formed in the second side surface 50c of the packing 50B. The first narrowing groove 55a and the second narrowing groove 55b are formed so as to have the same diameter with the axis L as the center. In other words, in the cross section of the packing 50B, the narrowing grooves 55a and 55b are formed so as to have the same height from the inner end surface 50a and disposed opposite to each other. The narrowing grooves 55a and 55b form a narrow portion 56 at which the width Wp of the packing 50B is reduced. As an illustrated example of FIG. 5(b), when the fluid pressure in the first space S1 is applied to the first side surface 50b, the narrowing grooves 55a and 55b facilitate elastic deformation and elongation of the packing 50B in the radial direction Y. Note that the cross section of the packing 50B is shaped in bilateral symmetry in the axis L direction with respect to the central axis of the cross section as are the cases in the other embodiments.

More specifically, each of the paired narrowing grooves 55a and 55b has a wall surface curved smoothly as a concave surface, or preferably, as a circular arc surface. The width of the narrow portion 56 is set to be larger than a half of the total width Wp of the packing 50B. The opening width of each of the narrowing grooves 55a and 55b at respective side surfaces 50b and 50c is smaller than a half of the total height Hp of the packing 50B. In addition, in the third embodiment, the paired narrowing grooves 55a and 55b and the narrow portion 56 are formed entirely in the inner end portion 52 of the packing 50B. More specifically, the narrowing grooves 55a and 55b and the narrow portion 56 are formed so as to be inside the groove 15, near the opening of the groove 15, and closer than the center of the packing 50B to the outer peripheral surface in the height direction.

In the third embodiment, the inner end surface 50a of the packing 50B is adhered to the bottom wall surface 15a of the groove 15 while the central axis of the cross section of the packing 50B is aligned with the central axis of the cross section of the groove 15. In other words, the packing 50B is fixed to the groove 15 at the center of the groove 15 in the width direction, and gaps having the same width (which is equal to (Wg−Wp)/2) are respectively formed between the first side surface 50b and the first sidewall surface 15b and between the second side surface 50c and the second sidewall surface 15c. Accordingly, the paired narrowing grooves 55a and 55b are in communication with the groove 15.

According to the seal structure with the packing 50B of the third embodiment, as illustrated in FIG. 5(b), when the spool 20 is switched from the first position (see FIG. 1) to the second position (see FIG. 2), the fluid pressure in the first space S1 generates a clockwise moment exerted on the packing 50B. Consequently, the edge portion of the packing 50B near the first space S1, in other words, near the first side surface 50b to which the fluid pressure of the pressurized fluid is applied, is elongated as is the case in the first embodiment. Here, the first narrowing groove 55a formed in the first side surface 50b is expanded due to the fluid pressure, whereas the second narrowing groove 55b of the oppositely positioned second side surface 50c is compressed, which facilitates elongation of the edge portion near the first side surface 50b. In addition, the gap formed between the second side surface 50c of the packing 50 and the second sidewall surface 15c of the groove 15 allows the edge portion near the first side surface 50b to elongate. Moreover, the packing 50B is adhered to the groove 15 at the center of the groove 15 in the width direction. The inner end surface (inner peripheral surface) 50a of the packing 50B can be thereby prevented from rising from the bottom wall surface 15a of the groove 15 due to the fluid pressure and the moment generated.

As a result, the first sealing portion 53 positioned near the first space S1 to which the fluid pressure of the pressurized fluid applies narrows the gap 8 (which is equal to (D0−Dp)/2) between the first sealing portion 53 and the slide surface 75 of the spool hole 7 or abuts the slide surface 75. Thus, the packing 50A can adequately seal the gap between the slide surface 75 of the spool hole 7 and the sliding surface 26a of the land portion 26.

Figure 6:
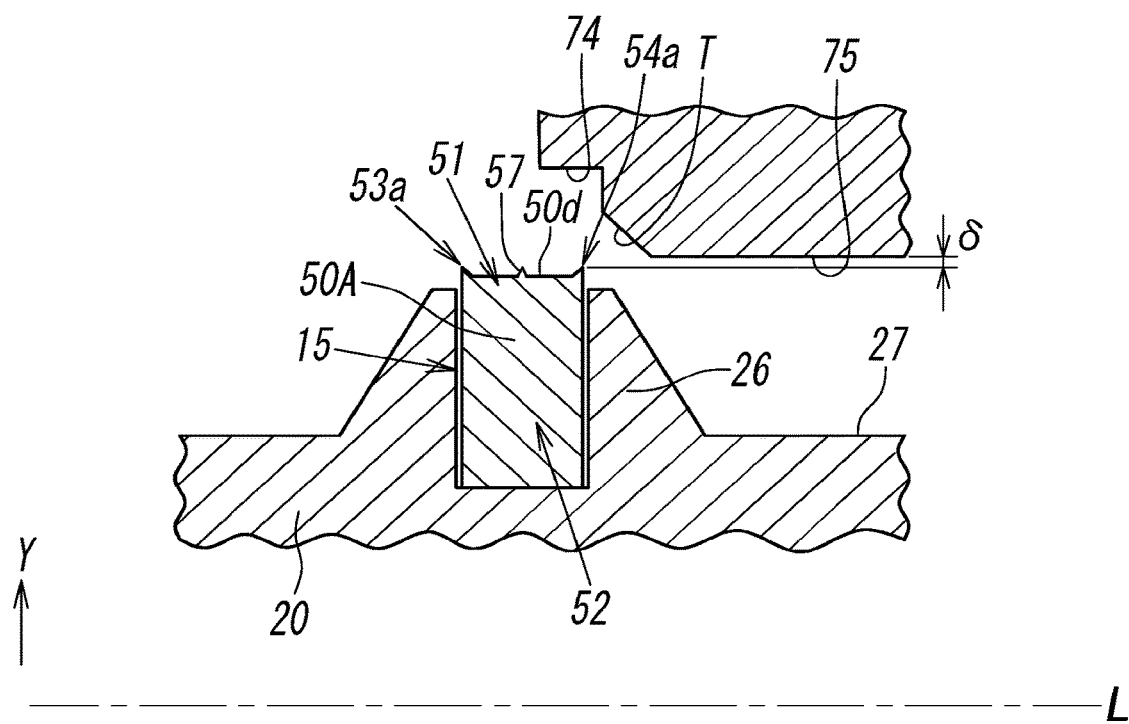
FIG. 6 is a schematic cross-sectional view illustrating a modification example of the seal structure of the second embodiment illustrated in FIG. 4.

Note that in the seal structure of the second embodiment, as illustrated in FIG. 6, a labyrinth protrusion 57 may be formed so as to protrude in the radial direction Y from the outer end surface 50d of the packing 50A at a position between the first protrusion 53a and the second protrusion 54a. The labyrinth protrusion 57 serves to form a labyrinth seal to reduce leakage of the pressurized fluid. The labyrinth protrusion 57 is preferably formed annularly around the axis L on the outer end surface 50d at the center in the axis L direction (i.e., in alignment with the central axis of the cross section of the packing 50A) so as to be parallel to the protrusions 53a and 54a. The labyrinth protrusion 57 may be formed such that the cross section thereof is shaped like a bilaterally symmetric wedge, such as an isosceles triangle having the acute vertex angle, of which the width gradually decreases toward the vertex. The height of the labyrinth protrusion 57 from the outer end surface 50d is preferably greater than the heights of the protrusions 53a and 54a.

The seal structure for the spool-type switching valve according to the present invention has been described. It should be understood that the present invention is not limited to the embodiments described above and may be subjected to various design changes without departing from the scope and spirit of the invention set forth in the claims.

Figure 4:
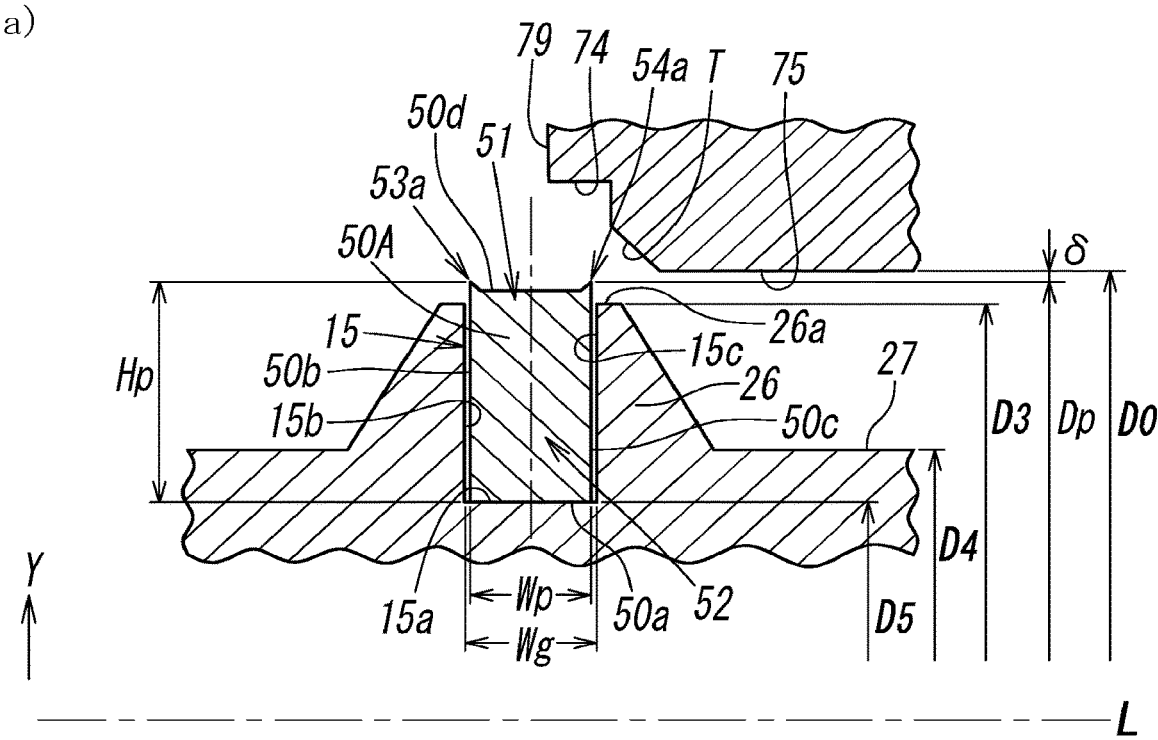
FIG. 4 are schematic cross-sectional views illustrating a second embodiment of the seal structure according to the present invention.
Figure 4:
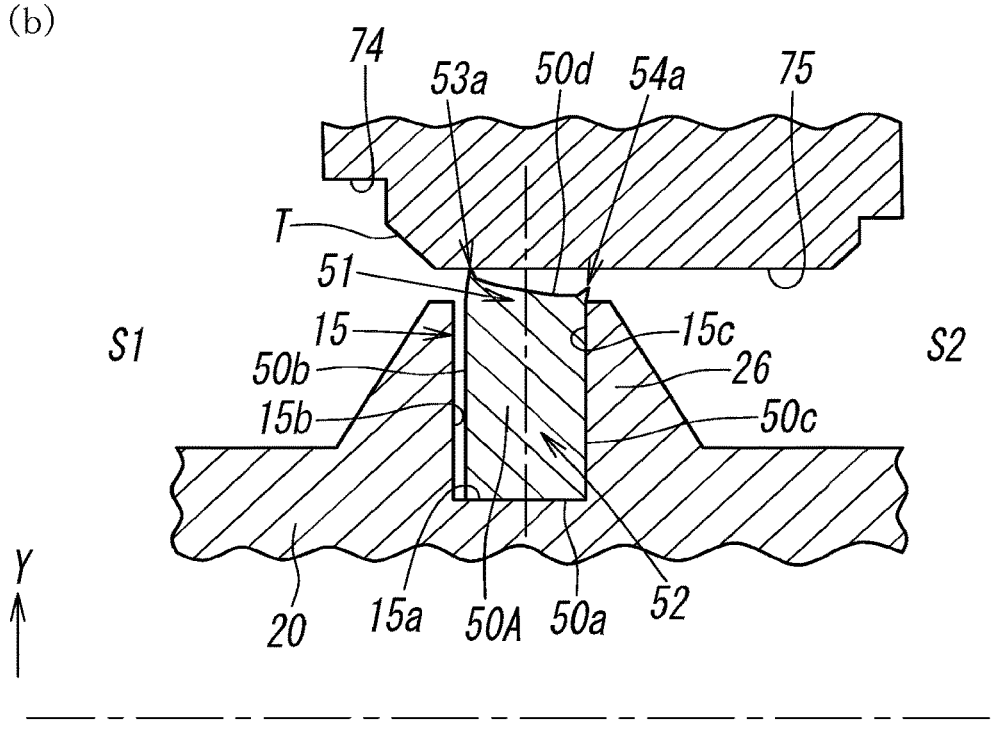
Figure 5:
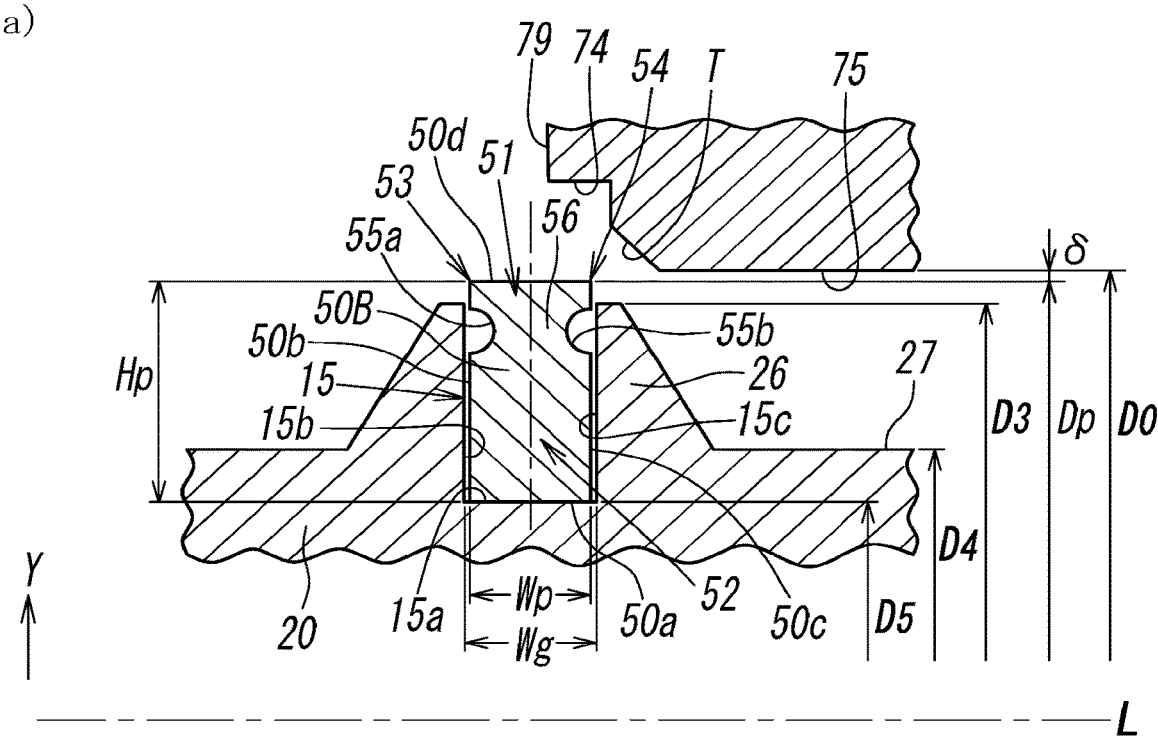
FIG. 5 are schematic cross-sectional views illustrating a third embodiment of the seal structure according to the present invention.
Figure 5:
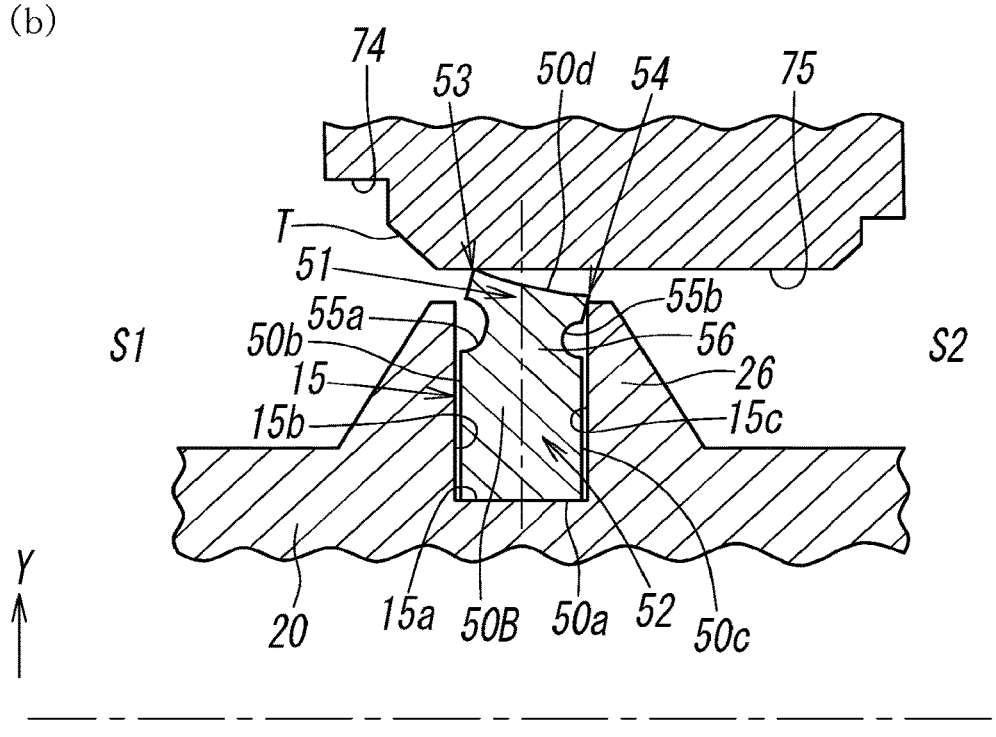

For example, in the first and second embodiments illustrated in FIG. 3 and FIGS. 4, the inner end surface 50a of the packing 50 may be fixed to the bottom wall surface 15a of the groove 15 using, for example, an adhesive, as is the case described in the third embodiment of FIG. 5. The valve actuation unit 5 for driving the spool 20 is not limited to that using the electromagnetic pilot valve unit. Various actuation mechanisms, such as a direct driven type, can be used to form the valve actuation unit 5. The number of ports and the number of land portions may be changed. The second piston 41 may be replaced with a coil spring. Moreover, although the sealing portions 53 (or 53a) and 54 (or 54a) preferably intersect the side surfaces 50b and 50c of the packing 50 in a right angle or in an acute angle as described above, the sealing portions are not limited to such configurations.

REFERENCE SIGNS LIST 1 spool-type switching valve (electromagnetic valve)
2 valve body
3 first adapter
4 second adapter
5 valve actuation unit (electromagnetic pilot valve unit)
6 housing
7 spool hole
8 gas supply channel
9 first output channel
10 second output channel
11 first gas discharge channel
12 second gas discharge channel
15 groove
15a bottom wall surface
15b first sidewall surface
15c second sidewall surface
20 spool
26 third land portion
26a outer peripheral surface (sliding portion, sliding surface)
27 fourth annular recess
50, 50A, 50B packing
50a inner end surface
50b first side surface
50c second side surface
50d outer end surface
51 outer end portion
52 inner end portion
53, 53a first sealing portion
54, 54a second sealing portion
55a first narrowing groove
55b second narrowing groove
56 narrow portion
57 labyrinth protrusion
74 third channel recess of spool hole
75 third slide surface of spool hole
6 gap between packing and slide surface (=(D0−Dp)/2)
D0 inside diameter of slide surface
Dp outside diameter of packing
Wp cross-sectional width of packing
Wg cross-sectional width of annular groove
L axis

The invention claimed is:

1. A seal structure for a spool-type switching valve, wherein
the switching valve includes
a spool hole that is formed so as to extend in an axis direction and is in communication with a gas supply channel, an output channel, and a gas discharge channel,
a spool inserted in the spool hole and slidable in the axis direction, and
a valve actuation unit that moves the spool so as to switch a connection state of the channels,
the spool includes land portions and annular recesses that are disposed alternately in the axis direction, the land portions having respective sliding portions formed on outer peripheries thereof, the annular recesses having outside diameters smaller than outside diameters of the land portions,
the spool hole is defined by an inner peripheral surface formed annularly around the axis, and annular channel recesses and annular slide surfaces are formed at the inner peripheral surface alternately in the axis direction, the channel recesses being recessed respectively in the inner peripheral surface at positions of the gas supply channel, the output channel, and the gas discharge channel and being connected to the channels, the land portions of the spool being slidable with the sliding portions opposing respective slide surfaces of the spool hole, an annular groove is formed in the sliding portion of each land portion so as to annularly surround the axis and so as to open in a radial direction, an inner end portion of a packing that includes an inner periphery of the packing is accommodated in the groove, and an outer end portion of the packing that includes an outer periphery of the packing protrudes from an opening edge of the groove, the packing being made of an elastic rubber member, the outer end portion of the packing includes a first sealing portion annularly surrounded at one edge portion in the axis direction and a second sealing portion annularly surrounded at an other edge portion in the axis direction, a maximum outside diameter on an outer periphery of the packing accommodated in the groove is formed so as to be smaller than a minimum inside diameter on the slide surface of the spool hole in a state in which a pressurized fluid is not supplied from the gas supply channel, and in a state in which the sliding portion of each land portion opposes the corresponding slide surface of the spool hole and a pressurized fluid is supplied from the gas supply channel to one of a pair of spaces in the spool hole partitioned by each land portion, the edge portion of the packing positioned near the space to which the pressurized fluid is supplied is elastically elongated in the radial direction due to pressure of the pressurized fluid, and one of the first sealing portion and the second sealing portion, which is positioned near the space to which the pressurized fluid is supplied, narrows a gap formed between the sliding portion and the corresponding slide surface of the spool hole or abuts the corresponding slide surface.

2. The seal structure according to claim 1, wherein
cross sections of the packing and the groove taken in the axis direction are in bilateral symmetry in the axis direction,
the groove is defined by a bottom wall surface that the inner end of the packing abuts and also by a pair of side wall surfaces that rise in the radial direction from opposite ends, in the axis direction, of the bottom wall surface so as to oppose each other, and
in the radial direction, a depth of the groove from the bottom wall surface to the opening edge thereof is made larger than a half of a height of the packing from the inner end to the outer end thereof.

3. The seal structure according to claim 2, wherein
the bottom wall surface intersects a pair of the side wall surfaces at an angle of 90 degrees or less in the groove.

4. The seal structure according to claim 3, wherein
in the axis direction, a maximum width of the inner end portion of the packing that is accommodated in the groove is made smaller than a minimum width of the groove between a pair of the side wall surfaces.

5. The seal structure according to claim 4, wherein
the inner end of the packing is fixed by an adhesive to the bottom wall surface of the groove.

6. The seal structure according to claim 1, wherein
the packing includes a pair of side surfaces that are positioned opposite to each other in the axis direction and that extend parallel to each other so as to face opposite directions to each other, and a cross section of the packing taken in the axis direction is in bilateral symmetry in the axis direction,
the outer end portion of the packing includes an outer end surface that opposes the corresponding slide surface, and
the first sealing portion is formed at one edge portion of the outer end surface, and the second sealing portion is formed at the other edge portion of the outer end surface, the one edge position being positioned opposite to the other edge portion in the axis direction.

7. The seal structure according to claim 6, wherein
the first sealing portion is a first protrusion that protrudes from the outer end surface in the radial direction, and the second sealing portion is a second protrusion that protrudes from the outer end surface in the radial direction.

8. The seal structure according to claim 7, wherein
in the radial direction, distances between the corresponding slide surface and tips of the first protrusion and the second protrusion are the same.

9. The seal structure according to claim 8, wherein
the outer end surface of the packing is formed so as to be parallel to the corresponding slide surface,
heights of the tips of the first protrusion and the second protrusion from the outer end surface are the same, and
the first protrusion and the second protrusion are spaced from each other in the axis direction.

10. The seal structure according to claim 9, wherein
the first protrusion and the second protrusion are shaped like wedges with respective widths in the axis direction decreasing from the outer end surface toward the tips.

11. The seal structure according to claim 9, wherein
a labyrinth protrusion for forming a labyrinth seal is formed on the outer end surface of the packing at a position between the first protrusion and the second protrusion.

12. The seal structure according to claim 6, wherein
narrowing grooves are formed in respective side surfaces of the packing so as to annularly surround the axis and so as to be in communication with the opening of the groove.

13. The seal structure according to claim 12, wherein
the narrowing grooves are formed of concave surfaces.

14. A spool-type switching valve comprising the seal structure according to claim 1, wherein
the switching valve includes a housing in which the spool hole is formed, and
a gas supply port that forms a gas supply channel and is connected to a pressurized fluid source to supply a pressurized fluid, an output port that forms an output channel and outputs the pressurized fluid from the pressurized fluid source to an external pressurized fluid device, and a gas discharge port that forms a gas discharge channel and discharges exhaust gas from the pressurized fluid device are formed at outer surfaces of the housing.

* * * * *